June 1, 1926.

J. T. BLEASDELL 1,587,276

WHEEL GUARD FOR CULTIVATORS

Filed July 6, 1925

Inventor
John T. Bleasdell

Patented June 1, 1926.

1,587,276

UNITED STATES PATENT OFFICE.

JOHN T. BLEASDELL, OF KINGSLEY, IOWA.

WHEEL GUARD FOR CULTIVATORS.

Application filed July 6, 1925. Serial No. 41,497.

My invention relates to a wheel guard attachment for cultivators, especially for the type used for cultivating corn, and it is my object to provide such a guard which is of simple, durable and inexpensive construction.

A further object is to provide a guard having a guard member adapted to extend entirely around the wheel of the cultivator and having an inclined portion on either side of the wheel so that corn stalks extending away from the row adjacent to which the wheel is traveling and across the path of the wheel will be lifted and moved back toward the row, out of the way of the wheel.

A further object is to provide such a wheel guard having means to adjust the guard member both vertically and longitudinally so as to allow fitting to various types of cultivators, the parts being so arranged that such adjustment may be accomplished without rendering the device complicated or expensive.

A still further object is to provide such a guard having a guard member comprising an inner and outer arm arranged in the shape of a V, the outer arm being adapted to automatically lift the fallen stalks, and for that purpose being inclined upwardly and rearwardly relative to the cultivator wheel when installed, and the inner arm being inclined upwardly and rearwardly at a somewhat greater angle so that where stalks of unusual length and unusual weight at the top are extended across the path of the cultivator wheel, the inner arm may assist in lifting the stalks so that they will not be injured.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1:
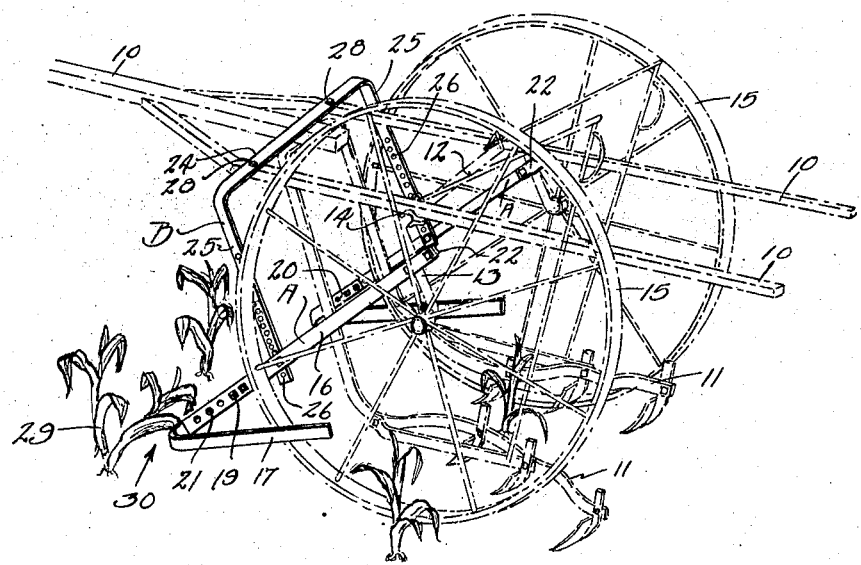
Fig. 1 is a perspective view of a cultivator following a corn row, with my improved attachment installed thereon, the cultivator parts being shown in dotted lines.
Figure 2:
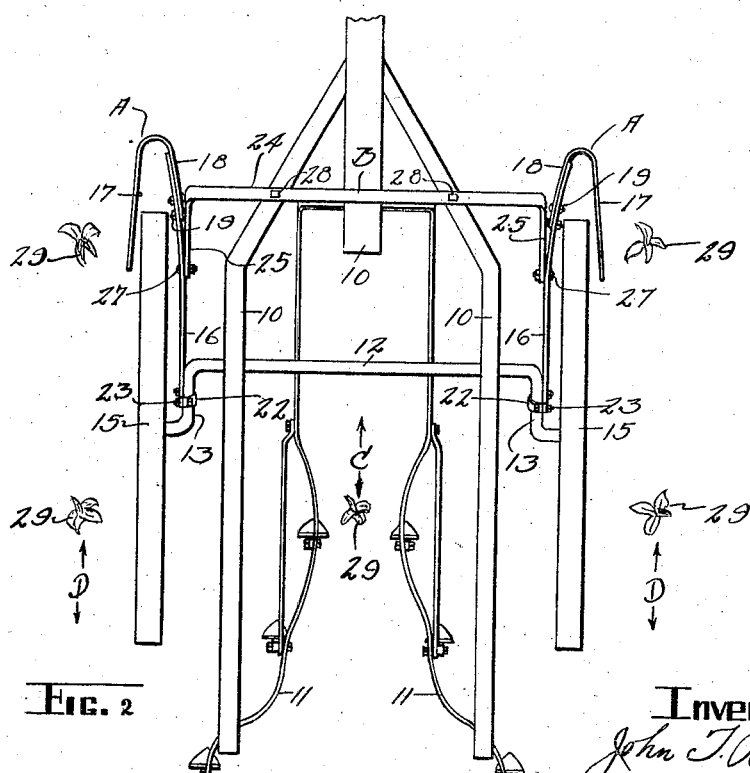
Fig. 2 is a plan view of the same, the cultivator parts being shown in full lines.

I have shown my attachment installed on a cultivator of the ordinary construction, involving generally the use of a tongue frame, to which is pivotally secured an axle having crank arms, on the end of which are mounted the wheels. The tongue frame, I have indicated by the reference character 10, the gangs by the reference character 11, the axle by the reference character 12 and the crank arms thereof by the reference character 13. The axle, 12, is secured to the tongue frame, 10, as at 14. Wheels, 15, are carried at the ends of the arms, 13.

The guard attachment comprises a guard member, A, and a supporting member, B, each of which is formed of lengths of strap metal, or the like. The guard member, A, has generally the shape of a V, and includes the long arm, 16, and the short arm, 17. The short arm, 17, forms the nose of the V, having a portion, 18, bent rearwardly and secured to the arm, 16, by means of bolts, 19, extended through any of a series of openings, 20 and 21, provided in the members, 18, and arms, 16, respectively.

At their free ends the arms, 16, are provided with U-shaped clamps, 22, which encircle the crank arms, 13, of the axle. The clamps, 22, are secured by means of bolts, 23, which may be loosened to allow vertical adjustment of the free ends of the arms, 16.

The arms, 16, are of such length as to extend beyond the ordinary cultivator wheel, and the clamps, 22, are shaped to allow the arms to extend downwardly and forwardly substantially as shown in Fig. 1. The arms, 17, are so spaced as to extend rearwardly on the outer sides of the wheels at an angle of less inclination than that of the arms, 16. I find by thus inclining the arms, 17, the attachment is more effective, as I will hereinafter more fully explain.

The nose of the guard member, A, is ordinarily positioned so as to extend to within a few inches of the ground, and its height may be varied by the supporting member, B, which I will now describe.

The supporting member, B, is an inverted U-shaped bracket of strap iron, having the intermediate portion, 24, and the depending arms, 25. In the arms, 25, are a number of openings, 26, to which the arms, 16, may be secured in any of several adjusted positions, by means of bolts, 27, extending therethrough. The arms, 25, may be slanted rearwardly somewhat so as to follow in a general way the arcs of circles described about the points of attachment of the arms, 16, to the crank arms, 13. They are secured in any suitable position to the tongue frame, as by means of machine screws, 28.

It will be seen that the yoke shaped member, B, provides a very effective means, not only of securing the guard members in vertically adjusted position, but also in maintaining them in their correct spaced relation laterally of the cultivator. The lateral position may be adjusted by bending the arms apart, which operation is a very quick and simple means of adjusting the guard members in this direction.

Being a unitary piece, the yoke, B, needs no additional braces to the cultivator frame to maintain the lateral adjustment of the arms, 25, and the arm, 16, itself serves to brace the arms, 25, against forward and rearward movement.

Referring now to the operation of the device, it will be understood that the cultivator is ordinarily used between rows of corn stalks, 29, the inner row, C, being cultivated by the plow gangs on either side, and the cultivator wheels, 15, traversing paths which lie very close to the adjacent rows, D, on either side of the row, C.

In Fig. 1, one of the corn stalks, 29, has been shown bent over, as at 30, across the path of travel of the wheel, 15, on that side. The nose of the guard member, A, is positioned very near to the ground, and will thus be moved under the reclining stalk by the advance of the cultivator, which will be gradually lifted by the upwardly inclined arms, 17, which will ordinarily engage a fallen stalk beyond the middle thereof.

However, should the cultivation be taking place in a field of unusually tall stalks, the engagement of the arm, 17, alone against the reclining stalk at a point much nearer the base thereof than the tip, would, in many cases, tend to injure the stalk, due to the weight of that portion extending beyond the arms, 17, tending to bend the stalk over the arm, 17. In such a situation the arm, 16, will assist the arm, 17, in raising the stalk, and is inclined upwardly at such an angle as to raise the outer end of the stalk more rapidly than the intermediate portion is raised by the arm, 17. Thus the weight of the stalk is more uniformly taken care of and the stalk is more readily lifted back to proper position.

For a cultivator having unusually large wheels the guard member may be extended by shifting the point of attachment of the arm, 16, to the portion, 18, of the arm, 17, and, if necessary, the point of attachment of the arm, 16, relative to the arm, 25, of the supporting yoke may also be changed.

The device is very simple and inexpensive in construction and yet provides for universal adjustment and is so designed as to minimize the danger of stalks being allowed to get under the wheels of the cultivator. Many times stalks grow outside of the true line of their row, and a guard member extending merely on the outside of the wheel might miss the stalk entirely, where the present guard member, its nose being positioned directly in front of the wheel, will not do so.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a cultivator wheel guard, to be used with a cultivator having a tongue frame, an axle crank arm, and a wheel carried at the end of said arm, a V-shaped guard member having a long and short arm, means to attach the long arm to said crank arm in position extending forwardly and downwardly, the short arm being so positioned relative to the long arm that it will then extend upwardly and rearwardly at an angle of less inclination than that of the long arm, and means for supporting the forward portion of the guard member from the tongue frame.

2. In a cultivator wheel guard, to be used with a cultivator having a tongue frame, an axle crank arm, and a wheel carried at the end of said arm, a V-shaped guard member having a long and short arm, means to attach the long arm to said crank arm in position extending forwardly and downwardly, the short arm being so positioned relative to the long arm that it will then extend upwardly and rearwardly at an angle of less inclination than that of the long arm, and means for supporting the forward portion of the guard member from the tongue frame comprising an inverted U-shaped yoke secured to said frame and having depending arms to which the guard member is secured.

3. In a cultivator wheel guard, to be used with a cultivator having a tongue frame, an axle crank arm, and a wheel carried at the end of said arm, a V-shaped guard member having a long and short arm, means to attach the long arm to said crank arm in position extending forwardly and downwardly, the short arm being so positioned relative to the long arm that it will then extend upwardly and rearwardly at an angle of less inclination than that of the long arm, and means for supporting the forward portion of the guard member from the tongue frame, comprising an inverted U-shaped yoke secured to said frame and having depending arms to which the guard member may be adjustably secured in any of several vertical positions.

4. In a cultivator wheel guard, to be used with a cultivator having a tongue frame, an axle crank arm, and a wheel carried at the end of said arm, a V-shaped guard member having an inner and outer arm, means to attach the inner arm to said crank arm in position extending forwardly and downwardly, the outer arm being so positioned relative to the inner arm that it will then extend upwardly and rearwardly, and means for supporting the forward portion of the guard member from the tongue frame, comprising an inverted U-shaped yoke secured to said frame and having depending arms to which the guard member may be adjustably secured in any of several vertical positions.

Signed at Kingsley, in the county of Plymouth and State of Iowa, this 30th day of June, 1925.

JOHN T. BLEASDELL.